(12) United States Patent
Anand et al.

(10) Patent No.: US 12,248,348 B2
(45) Date of Patent: Mar. 11, 2025

(54) SYSTEM AND METHOD FOR OPTIMIZING BILL OF MATERIAL COST AND POWER PERFORMANCE OF PLATFORM SYSTEM-ON-CHIP FOR BATTERY MANAGEMENT SYSTEM

(71) Applicant: TriSpace Technologies (OPC) Pvt Ltd., Bengaluru (IN)

(72) Inventors: Narasimhan Vijay Anand, Bengaluru (IN); Indhushree Devaraja, Bengaluru (IN); Krishnakumar Gopinath, Bengaluru (IN); Gangadhar Kamarthi Guruswamy, Bengaluru (IN)

(73) Assignee: TriSpace Technologies (OPC) Pvt. Ltd., Bengaluru (IN)

( * ) Notice: Subject to any disclaimer, the term of this patent is extended or adjusted under 35 U.S.C. 154(b) by 119 days.

(21) Appl. No.: 18/357,417

(22) Filed: Jul. 24, 2023

(65) Prior Publication Data
US 2025/0004517 A1   Jan. 2, 2025

(30) Foreign Application Priority Data
Jun. 28, 2023   (IN) .............................. 202341043200

(51) Int. Cl.
*G06F 1/26*   (2006.01)
*H02J 7/00*   (2006.01)

(52) U.S. Cl.
CPC .............. *G06F 1/26* (2013.01); *H02J 7/0048* (2020.01)

(58) Field of Classification Search
CPC ................................. G06F 1/26; H02J 7/0048
USPC ......................................................... 713/300
See application file for complete search history.

(56) References Cited

U.S. PATENT DOCUMENTS

| 5,615,400 A * | 3/1997 | Cowsar ............... G06F 9/44521 711/118 |
| 10,390,309 B1 | 8/2019 | Anand |
| 11,330,526 B2 | 5/2022 | Anand |
| 2006/0100833 A1* | 5/2006 | Plett ...................... H01M 10/48 703/2 |

(Continued)

FOREIGN PATENT DOCUMENTS

IN   422733 B   2/2023

OTHER PUBLICATIONS

Examination Report from corresponding application IN202341043200 issued on Oct. 25, 2023, 7 pages.

*Primary Examiner* — Paul R. Myers
(74) *Attorney, Agent, or Firm* — J. Peter Paredes; Amin Wasserman Gurnani LLP

(57) ABSTRACT

The present invention provides a system and method for optimizing BOM cost of platform SoC for Battery management system. The system (100) comprises a sensor (101), coupled with the device to receive input physical parameters Temperature, Voltage and current and a CPU with SIMD extensions without saturation logic in the instruction set and floating-point unit, wherein Battery management module is implemented (101). Using CPU with SIMD extensions instead of DSPNLIW core in platform SoC helps in lowering the BoM cost and the inventive steps helps in achieving bit-exact results overcoming the limitations of CPU ISA as against DSP ISA. The power consumed in either case (Battery management implementation on CPU, DSP ISA) is the same, thus giving value additions to platform SoC designers and makers.

4 Claims, 3 Drawing Sheets

(56) References Cited

U.S. PATENT DOCUMENTS

| | | | |
|---|---|---|---|
| 2010/0156355 A1* | 6/2010 | Bauerle | H02J 7/007194 |
| | | | 320/152 |
| 2010/0235144 A1* | 9/2010 | Mosberger-Tang | G01D 4/004 |
| | | | 709/219 |
| 2016/0066280 A1 | 3/2016 | Heo et al. | |
| 2021/0199724 A1 | 7/2021 | Kim | |
| 2022/0342002 A1* | 10/2022 | Bharathraj | G01R 31/388 |
| 2023/0106428 A1* | 4/2023 | Ben Yaakov | B60L 50/60 |
| | | | 320/117 |
| 2023/0138447 A1 | 5/2023 | Ko et al. | |

* cited by examiner

SYSTEM AND METHOD FOR OPTIMIZING BILL OF MATERIAL COST AND POWER PERFORMANCE OF PLATFORM SYSTEM-ON-CHIP FOR BATTERY MANAGEMENT SYSTEM

CROSS-REFERENCE TO RELATED APPLICATIONS

The present application claims priority to Indian patent application serial no. IN202341043200, filed Jun. 28, 2023, herein incorporated by reference in its entirety.

FIELD OF THE INVENTION

The present invention relates to a system and method for optimizing Bill of Material (BoM) cost and power-performance in platform System-On-Chip (SoC) for Battery Management system. More specifically, the present invention relates to optimizing BoM cost of platform SoC for Battery management system by implementing battery management modules on a Central Processing Unit (CPU) with Single Instruction Multiple Data (SIMD) extensions instead of implementing on a Digital Signal Processor (DSP) core, thus avoiding need for DSP core on the platform SoC which takes more chip area than the CPU.

BACKGROUND OF THE INVENTION

A Battery Management System (BMS) is an intelligent component of the lithium-ion battery/lithium-ion battery pack responsible for monitoring and controlling same. The Battery Management System plays a vital role in regulating the levels of protection, performance, charge rates, and durability.

BMS is a separate entity with hardware and firmware and is connected to a battery charger. BMS consists of a number of sensing devices for monitoring battery parameters that will be used in the algorithm for State of Charge (SOC) estimation.

Cell voltages, battery current, and battery temperature at different points of the battery bank, as well as the ambient temperature, is captured by sensors and converts them into digital values.

A general-purpose microprocessor or Digital signal processor (DSP) core Instruction Set Architecture (ISA) is used to implement a typical BMS algorithm, by monitoring the physical quantities-Temperature, voltage and current. The saturation logic in each instruction cost few hundreds/thousands of Gates which increase the chip area and BoM cost of Platform SoC. CPU core ISA has only SIMD extensions and lacks saturation logic except for three instructions namely ADD, SUB and a dedicated SAT instruction. The power consumption in implementing with this limitation of ISA and getting bit-exact results on CPU as compared to DSP is challenging. This invention achieves results of implementing Battery management module on CPU whilst achieving same power performance and lowering BoM cost by replacing DSP core with CPU core in platform SoC.

The Indian patent document IN422733 titled "A System and method for optimizing Bill of material (BOM) cost and power performance of platform system-on-chip in Mobile device" discloses a method and apparatus for optimizing BOM cost and power consumption in mobile devices by suitable Instruction Set Architectural feature changes and optimal implementation of video codecs. However, the solution is aimed at primary targeting the Mobile device and Multimedia signal processing use case.

SUMMARY OF THE INVENTION

The present invention overcomes the drawbacks in the prior art and provides a system and method for optimizing BoM cost and power-performance of platform SoC for battery management system.

The system comprises single CPU with SIMD extensions in the platform SoC. A sensor integrated with the device, receives input physical quantities-temperature, voltage, current and converts into digital data of size of 13 bits.

In an embodiment of the invention, digital data of physical quantities is used in BMS algorithm and the battery management module are implemented are implemented in a CPU with instruction set having SIMD extension but without critical single cycle instruction Multiply and Accumulate (MAC). The current consumption in the System-On-Chip (SoC) is same in either case—with a CPU or with a DSP, but has added advantage of lowering BoM cost with CPU instead of DSP.

The physical quantities span 13 bits in a 16 bit word, thus providing 3 guard bits when implementing any of the basic math operations (addition, subtraction, multiplication, multiplication with accumulation). The register size is in multiples of 16 bits, and thus SIMD ISA without saturation logic is able to provide bit exact results.

Thus, the present invention provides method to optimize the BoM cost of platform SoC while still achieving same power consumption for battery management system as against platform SoC having DSP core.

The need for DSP core in platform SoC is replaced with CPU core thereby reducing BOM cost of platform SoC.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

In order to more clearly and concisely describe and point out the subject matter of the claimed invention, the following definitions are provided for specific terms, which are used in the following written description.

The present invention provides a system and method for optimizing BOM cost of platform SoC and power-performance for battery management system. The system comprises a single CPU with SIMD extensions wherein, a battery management module is implemented, instead of DSP/VLIW core. The savings in BoM cost due to lack of saturation logic and floating point unit results in up-to several thousand logic gates reduction in platform SoC compared to implementation of all the module on DSP/VLIW processor.

Figure 1:
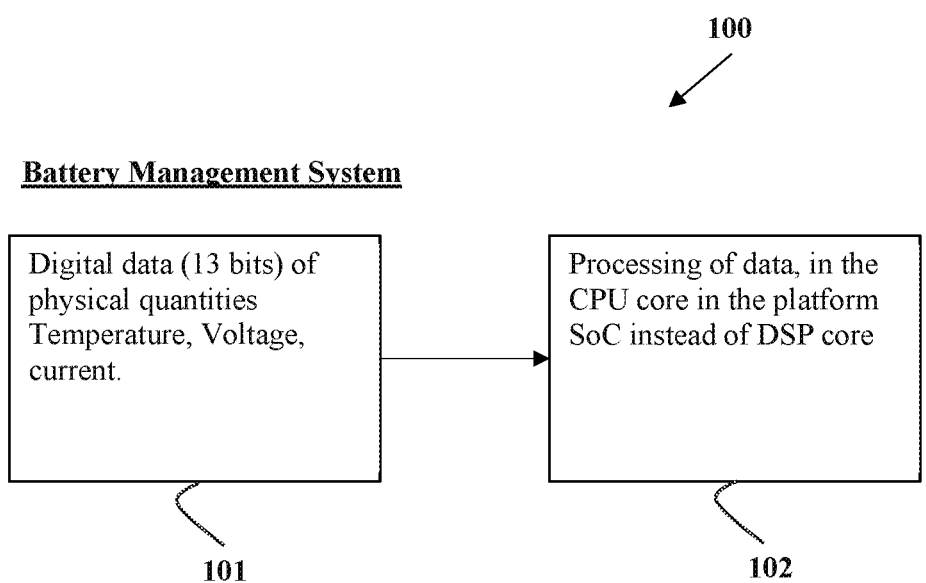
FIG. 1 illustrates a block diagram of a system for implementing Battery management algorithm in the platform SoC for Battery management system, according to one embodiment of the invention.

FIG. 1 illustrates a block diagram of a system for implementing battery management system, according to one embodiment of the invention. In a preferred embodiment, the system comprises a sensor which receives input physical quantities-temperature, voltage, current and converts them into electrical signal (101), a CPU core with SIMD extensions (102) which is tasked with implementing battery management modules.

The physical quantities samples are fed to a battery management module (102). The battery management module is configured to monitor and analyze the data, perform filtering algorithms, and provide control mechanism for safe and reliable operation of battery on a CPU with SIMD extensions. The various coding tools of the battery management system is implemented on the CPU with SIMD extensions. The current consumption in the SoC in either case (battery management system on CPU, DSP) is same while reducing BoM cost significantly in using CPU (102) compared to an implementation on DSP/VLIW core.

Figure 2:
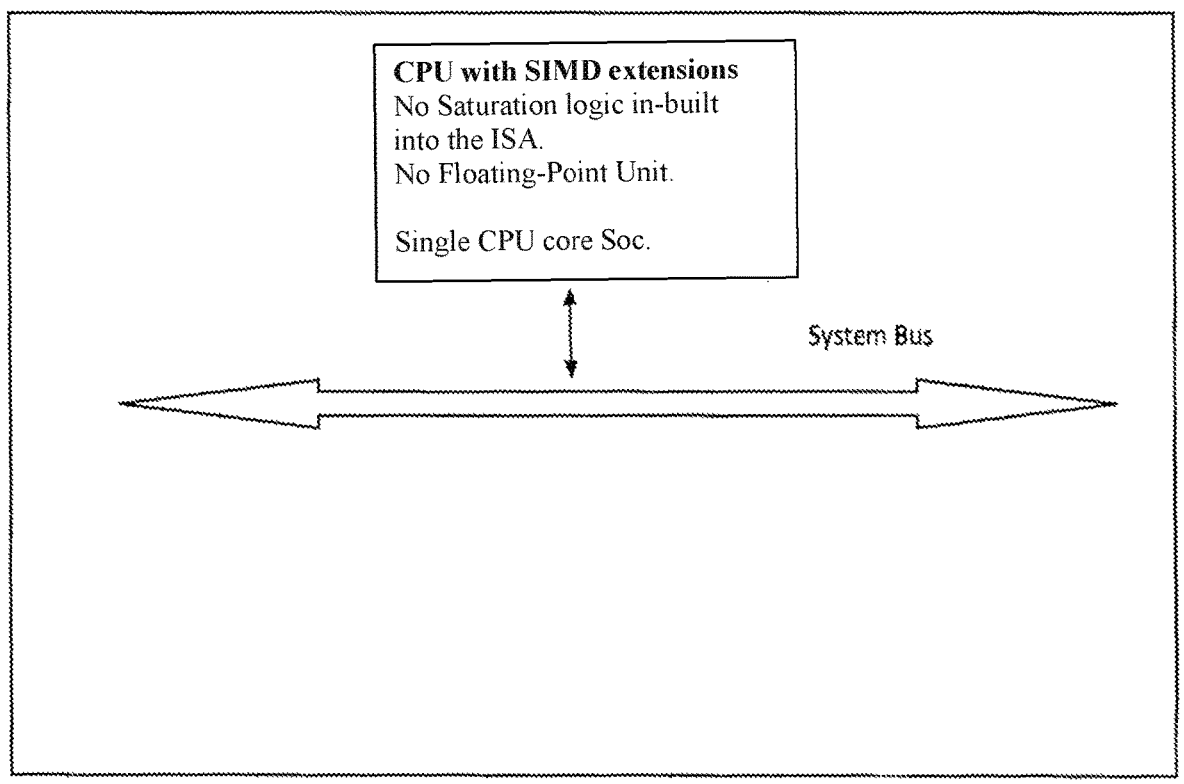
FIG. 2 illustrates a method for optimizing BoM cost of platform SoC, according to one embodiment of the invention.

FIG. 2 In an embodiment of the invention, the implementation of battery management modules on a single CPU core results in efficient implementation of battery management modules without increase in current consumption whilst reducing BoM cost of platform SoC. The Architecture of the SoC contains single CPU with SIMD extensions cores without any DSP/VLIW core and lacking floating point unit. Thus, lower BOM cost platform SoC is built while still maintaining same power consumption for battery management system in the present invention.

Figure 3:
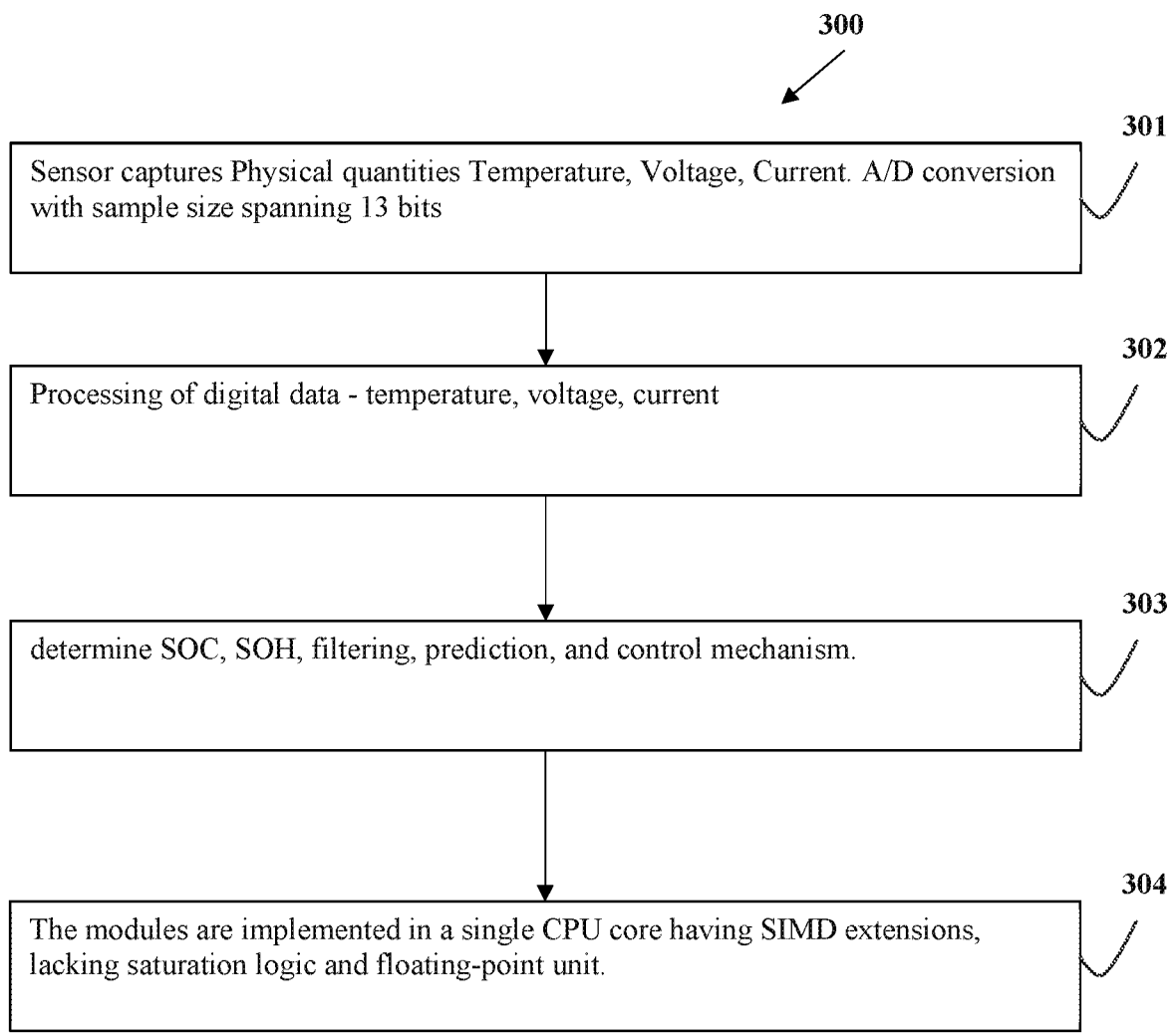
FIG. 3 illustrates a method for optimizing BOM cost of platform SoC whilst implementing battery management module in a BMS, according to one embodiment of the invention.

FIG. 3 illustrates the method for optimizing power consumption in battery management system, according to one embodiment of the invention. In a preferred embodiment, the method initiates with the step of receiving and recording raw physical quantities—temperature, voltage, current at step 301. Providing digital samples spanning 13 bits for each of the physical quantities [0027] At step 302, physical quantities samples are processed by battery management module. The various coding tools of the BMS algorithm including SOC estimation, State of Health (SOH) estimation, filtering and control mechanism is implemented on CPU core at step 303. The current consumption in battery management system is still the same as compared to DSP core implementation and achieving bit-exact results overcoming the limitation of CPU ISA.

At step 304, The battery management module is implemented on CPU with SIMD extensions and without saturation logic in instruction set and without floating point unit (101).

The inventive step in battery management module implemented on CPU with SIMD extensions is described now. The physical quantities samples are configured to 13 bits. The filtering operation is 3 tap filter, the intermediate results still within 16-bit span. Turning off saturation is thus safe, and the instruction set can constructed without saturation embedded into it and SIMD optimization is possible, thus saving Bill of Material (BOM) cost and giving similar power performance as in DSP implementation of battery management module. Other basic math operations also take advantage of the fact that values do not cross 16-bit boundary, and so safe SIMD implementation without need for saturation logic is possible.

Thus, the present invention provides a method to optimize the BoM cost of platform SoC for Battery management system.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos.

In some embodiments, some or all of the functions or process(es) described herein and performed by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

We claim:

1. A system (100) for optimizing Bill of Material (BoM) cost and power performance of platform System-On-Chip (SoC) for Battery Management System, the system (100) comprising:
   a. Sensor configured to receive (101) input physical quantities Temperature, Voltage and current from the battery pack and convert to electrical signal;
   b. a Central Processing Unit (CPU) core with Single Instruction Multiple Data (SIMD) extensions (102) which implements the Battery management modules;
   c. Battery management modules including physical quantities data monitoring and analysis, Kalman filter (102), wherein the modules are implemented in the CPU core with SIMD extensions;
   d. saturation is turned off in the Battery management module;
   e. the SoC is designed to have single CPU with SIMD extensions; where in the Arithmetic Logic Unit (ALU) of CPU is designed without saturation in the critical instructions, wherein the critical instruction include but not limited to Multiply and Accumulate (MAC) and shift instructions; and
   f. ALU of CPU is designed without floating point unit.

2. The system as claimed in claim 1, wherein the BoM cost of platform SoC is reduced compared to platform SoC having Digital Signal Processor/Very Large Instruction Word (DSP/VLIW) core to implement Battery Management modules.

3. A method for optimizing BoM cost and power performance of platform SoC in mobile devices, the method comprising the steps of:
   a. Receiving, by a sensor, input physical quantities Temperature, voltage, and current;
   b. Converting, by the sensor, the input physical quantities into an electrical signal, wherein the sensor is coupled with the Battery management device (100);
   c. Processing the electrical signals by the battery management module, generates battery management monitoring and control; solution (101), wherein the Battery management module (101) is implemented in another CPU core with SIMD extensions;
   d. saturation is turned off in the battery management module;
   e. the SoC is designed to have single CPU with SIMD extensions; where in the ALU of CPU is designed without saturation in the critical instructions, wherein the critical instruction include but not limited to MAC and shift instruction; and
   f. ALU of CPU is designed without floating point unit.

4. The method as claimed in claim 3, wherein the BoM cost of platform SoC is reduced compared to platform SoC having Digital Signal Processor very Large Instruction Word (DSPNLIW) core to implement Battery Management modules.

* * * * *